United States Patent [19]

Wood et al.

[11] 3,871,408
[45] Mar. 18, 1975

[54] OIL SUCTION AND DISCHARGE HOSE
[76] Inventors: James Wood, 65 Silverknowes Gardens; George Sunnett, 15 Viewforth Square, both of Edinburgh, Scotland
[22] Filed: Aug. 10, 1973
[21] Appl. No.: 387,555

[30] Foreign Application Priority Data
Aug. 4, 1972 United Kingdom............ 36519/72

[52] U.S. Cl.................. 138/137, 138/125, 138/132
[51] Int. Cl............................................. F16l 11/12
[58] Field of Search .......... 138/137, 153, 103, 125, 138/109, 149, 132; 174/101.5

[56] References Cited
UNITED STATES PATENTS

| | | | |
|---|---|---|---|
| 1,535,647 | 4/1925 | Brennan............................. | 138/137 |
| 2,453,418 | 11/1948 | Dunsheath et al................ | 174/101.5 |
| 3,295,557 | 1/1967 | Christiansen ...................... | 138/125 |
| 3,548,884 | 12/1970 | Ambrose.......................... | 138/137 X |
| 3,729,028 | 4/1973 | Horvath et al.................. | 138/137 X |

FOREIGN PATENTS OR APPLICATIONS
1,810,396   11/1968   Germany........................... 138/137

Primary Examiner—Richard C. Queisser
Assistant Examiner—Daniel M. Yasich
Attorney, Agent, or Firm—Herbert Stern

[57] ABSTRACT

A suction and discharge hose is disclosed. The hose includes a tubular substrate which incorporates two or more plies of reinforcing cords, each ply being helically wound at an angle of 52° relative to the hose axis and crossed relative to the adjacent ply. A plurality of axially alternating sections of a relatively hard and of a relatively soft polymeric material circumferentially surround the substrate. Two or more plies of monofilament polyester, which has a tensile modulus exceeding ninety grams per denier, overly each of the sections of the hard polymeric material only, and an outer cover of an abrasion resistant rubber circumferentially surrounds the plies of monofilament polyester and the sections of soft polymeric material.

40 Claims, 3 Drawing Figures

PATENTED MAR 18 1975 3,871,408

OIL SUCTION AND DISCHARGE HOSE

BACKGROUND OF THE INVENTION

This invention relates to an oil suction and discharge hose.

Various constructions of oil suction and discharge hose are known, all being designed to attempt to meet the basic properties required of this type of hose, i.e. high burst pressure, high resistance to collapse under vacuum, flexibility and low longitudinal extension.

Conventionally constructed hose relies upon a helically wound steel or fibre glass rod, or upon rings of steel or fibre glass, built into the wall of the hose to support the hose body, prevent total collapse when the hose is subjected to an internal vacuum and to prevent inward collapse of the wall when the hose is bent within certain limits. This construction has its limitations in that its bending radius is limited and the hose is destroyed if taken below this minimum radius. Furthermore if such a hose is accidentally locally flattened by a high force its recovery is limited.

According to the present invention an oil suction and discharge hose comprises a radially inner structure, incorporating at least two layers of reinforcing cords, the cords of each layer being in crossing relation to those in each adjacent layer; a filler assembly circumferentially surrounding the inner structure, the filler assembly comprising axially alternating sections of a first and of a second material, the second material being more flexible than the first material; a fibre reinforcement layer overlying only the sections of first material, the fibres of said reinforcement layer having a tensile modulus of at least 50 grams per denier; and an outer cover circumferentially surrounding the fibre reinforcement layer and the sections of second material.

Such hose relies on the fibre reinforcement layer to give it its required properties of high burst pressure and low elongation, rather than a metallic or fibre glass body reinforcement. Fibrous material having a tensile modulus of the values contemplated is, however, extremely difficult to flex, and by interrupting the fibrous material layer in the region of the second, more flexible filler material, the hose is allowed to flex by compression in the regions of the more flexible material. Hose reinforced with the high tensile fibrous material is extremely difficult to squash and will withstand being flattened many times without showing signs of damage.

The fibres of the reinforcement layer may be chosen from many different types of material. The fibres may be metallic, or may be of graphite or carbon. At present, textile fibres are preferred, examples of suitable fibres being polyamides, polyaramides, polyolefins, modacrylics and polybenzimidazole. The fibre is preferably a monofilament, and desirably its tensile mudulus is at least 90 grams per denier. A monfilament polyester fibre is particularly preferred, one particular example being the fibre sold by I.C.I. Fibres Limited under the name "Macrofil", which has a tensile modulus of 93 grams per denier.

The reinforcing cords in the radially inner structure of the hose may be of glass fibre, metal wire or textile material, particularly the textile materials mentioned above. For the present, however metal wire or glass fibre is preferred for the reinforcing cords.

The filler assembly may comprise axially alternating hoops of the first and second materials, or contiguous strips of the first and second materials wound helically into the hose construction. In the first case the fibres of the reinforcement layer are preferably wound around the hoops of first material substantially at right angles to the hose axis; in the second case the fibres are preferably wound around the strip of first material at substantially the same helix angle as said strip.

There is no critical relationship between the axial widths of the sections of first and second material. If the hose is to be constructed so that the body structure has a mean density of less than 1.0 (i.e. the hose will float when full of water) then preferably the width of the sections of second material is greater than that of the first, otherwise preferably the width of the sections of first material is greater than that of the second, e.g. 3 6 times greater.

The first and second materials which are sandwiched between two reinforcing bands, may each be chosen from a large number of materials. The first, more rigid material, may thus be a hard rubber or plastic material or glass-fibre reinforced resin. The second, more flexible material, may be a soft rubber or plastic material. Preferably both materials are rubbers, the first material desirably being a rubber having a Shore A hardness of between about 70° and 90° and the second material desirably being a more flexible rubber having a Shore A hardness of between about 30° and about 50°.

If the hose is to have a mean density of less than 1.0, then foamed rubber or plastic materials may be used for the first and second materials, the first material conventiently being foamed and cured hard rubber of an ebonite-like nature, and the second material conveniently being a cured soft rubber sponge. In this embodiment the load deflection characteristics of the first material are such that the load required for 5 percent deflection is between 200 and 400 psi, and the load required for 10 percent deflection is between 550 and 750 psi. For the second material the load required for 25 percent deflection is from 3 to 20 psi, and the load required for 50 percent deflection is from 10 to 50 psi.

BRIEF DESCRIPTION OF THE DRAWINGS

In order that the invention may be better understood specific embodiments of hose in accordance with the invention will now be described in more detail with reference to the accompanying drawings, in which.

DESCRIPTION OF THE PREFERRED EMBODIMENT

Figure 1:
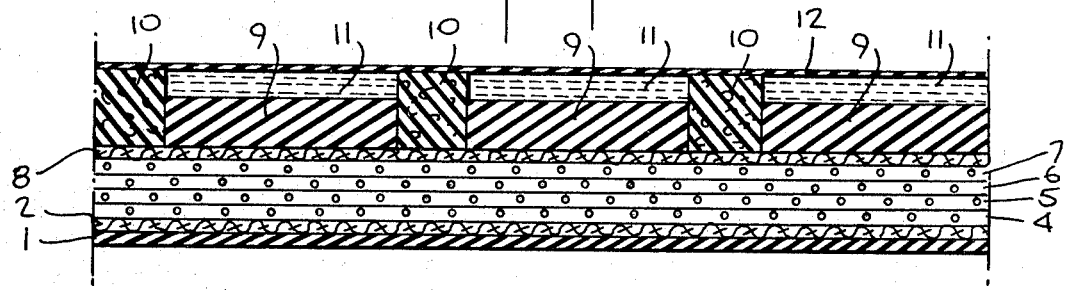
FIG. 1 is an axial cross-section through the wall of part of a first embodiment of a hose according to the invention.

Referring now to FIG. 1 the hose comprises an inner liner 1 of a rubber material which is resistant to attack by the fluid which the hose is to convey. This liner is covered by a ply 2 of textile fabric. Surrounding layer 2 are four piles, 4 to 7 inclusive (2 plies or 6 plies may alternatively be used), of reinforcing metal wire cords. The cords in each ply make an angle of between about 30° and about 70°, and preferably, as in the embodiment illustrated, make an angle of about 52°, with the hose axis, and the cords in alternate plies are laid in opposite directions so that they cross each other. The cords are embedded in rubber, e.g. by coating or calendering, in the manner of tire cord fabric. The cord plies are covered by a further ply 8 of textile fabric. The aforesaid layers constitute the radially inner structure of the hose, which is of substantially conventional construction.

This inner structure is circumferentially surrounded by a filler assembly comprising axially alternating sections of a hard rubber material 9 and a more flexible soft rubber material 10. These may be alternating hoops of material placed around the hose at 90° to the axis thereof, or the sections may be formed by winding two contiguous strips of material around the hose. In the latter case the winding angle is preferably between 70° and 90° relative to the hose axis. It will be noted that the soft rubber sections 10 are radially thicker than the hard rubber sections, but that the hard rubber sections are about 3½ times the axial width of the soft rubber sections.

Wound over the hard rubber sections is a fibre reinforcement layer 11 consisting of three plies of fibre having a tensile modulus of at least 50 grams per denier, and preferably of the monofilament polyester known as "Macrofil", which has a tensile modulus of 93 grams per denier. The fibres in these plies are, if sections 9 and 10 are hoops, wound around section 9 substantially at right angles to the hose axis and, if sections 9 and 10 are helically wound, wound around section 9 at the same angle to the hose axis as the helix angle of the sections 9 and 10. Finally, the layers 11 and soft rubber material sections 10 are covered by a cover layer 12 of wear-resistant rubber.

In a specific embodiment of hose as described, the hard rubber material 9 is a conventional compound including clay and carbon black fillers (about 120 parts total filler to 100 parts rubber by weight) and also conventional processing and curing acids. The cured rubber has a Shore A hardness of 80°. The soft rubber material 10 is a conventional compound of styrene-butadiene and reclaimed rubber (about two parts SBR to one part reclaim by weight), with resin and carbon black filler (about 4 parts total filler to 10 parts total rubber by weight), and conventional processing and curing aids. The cured rubber has a Shore A hardness of 40°.

In manufacture of the hose, the radially inner structure of the hose is built and subjected to a semi-cure process involving a 2 hour rise to a steam pressure of 40 psi over atmospheric and a 2 hour dwell at this pressure. The filler assembly, the fibre reinforcement and the cover layer are then applied, and final cure is effected under the same conditions as for the semi-cure.

Figure 2:
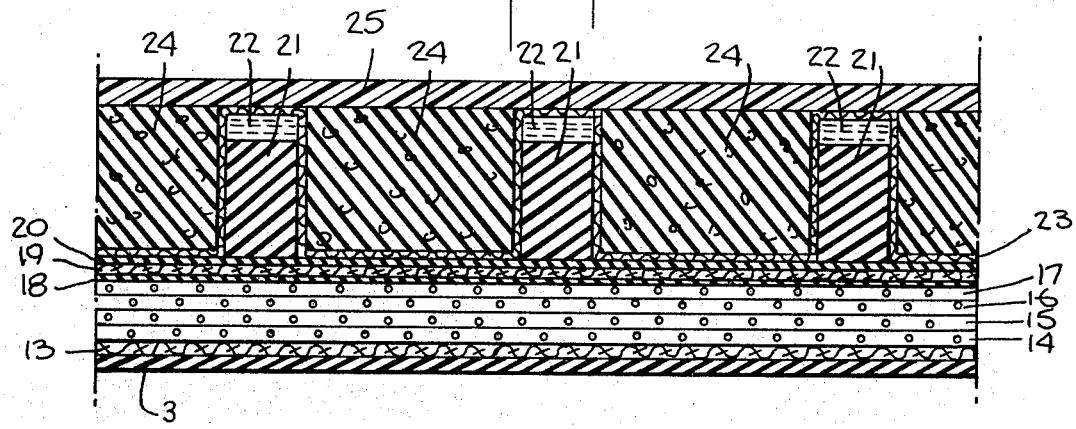
FIG. 2 is an axial cross-section through the wall of part of a second embodiment of the hose according to the invention.

FIG. 2 shows a hose construction which can be made to have a mean density of less than 1.0, i.e. the hose will float when full of water. The hose comprises a resistant rubber inner liner 3, ply 13 of textile fabric, plies 14 to 17 of reinforcing metal wire cords embedded in rubber, layer 18 of cushion rubber, layer 19 of textile fabric and layer 20 of cushion rubber, these layers together constituting the radially inner structure of the hose.

Hard, preferably foamed, rubber filler material 21 extends around part of the radially inner structure, either as a helically wound strip or as a series of axially spaced hoops. Wound over the material 21 is a fibre reinforcement layer 22 consisting of three plies of fibre having a tensile modulus of at least 50 grams per denier, and preferably of polyester. Once again, if hoops of material 21 are used, the fibres in layer 22 are wound substantially at right angles to the hose axis, and if material 21 is helically wound, the fibres in layer 22 are wound at substantially the same helix angle. A fabric ply 23 covers the layer 20, material 21 and layer 22. The spaces between the sections of material 21 are filled with foamed soft rubber filler material 24, this being helically wound or applied as hoops as appropriate. Finally there is a layer 25 of abrasion-resistant rubber or of a plastic material over the structure.

In a specific embodiment of hose as shown in FIG. 2 the hard foamed rubber material 21 is compounded similarly to the hard rubber 9 previously described, but with 12 parts of blowing agents per 100 parts of rubber also in the mix. The cured rubber has load deflection characteristics such that the load required for 5 percent deflection is 300 psi, and that required for 10 percent deflection is 650 psi.

The soft rubber material 24 is commercially available cured expanded rubber having a density of 8 pounds per cubic foot and load deflection characteristics such that the load required for a 25 percent deflection is 5 psi and that required for a 50 percent deflection is 15 psi.

In manufacture of this floating hose the radially inner structure is built, and the hard rubber filler material 21 is applied. This structure is then semi-cured with a 2 hour rise to a steam pressure of 40 psi above atmospheric and a 2 hour dwell at this pressure. The fibre reinforcement layer 22, the fabric ply 23 and the soft expanded rubber 24 are then applied, and finally, layer 25 is applied. Cure is completed in steam at 5 psi above atmospheric for 6 hours, the low pressure being used to avoid collapsing the soft foam.

To give adequate flexibility and adequate spacing of the two reinforcing bands for hoses of diffferent wall thickness, the radial thickness of the layer of alternate rubbers needs to become greater as the wall thickness increases. For an 8 inch internal diameter non-floating hose, having a wall thickness of about 1.75" a thickness of about 0.75" for the soft rubber layer has been found suitable.

A hose built according to the invention may, in a further modification, be designed to have variable stiffness along the length of the hose. There is an advantage in providing a hose, for example, as a terminal section of a floating hose line, which is stiffer at one end thereof and which is progressively more flexible towards the other end thereof. In a construction according to the invention this variable stiffness may be provided either by varying the radial thickness of the filler assembly so that it is thicker in the region where greater stiffness is required, or by using different widths of first and second materials in said filler assembly, the ratio of the width of the less flexible material to the width of the more flexible material being higher in the regions where greater stiffness is required. A combination of varying radial thickness and varying width ratios may also be used.

Figure 3:
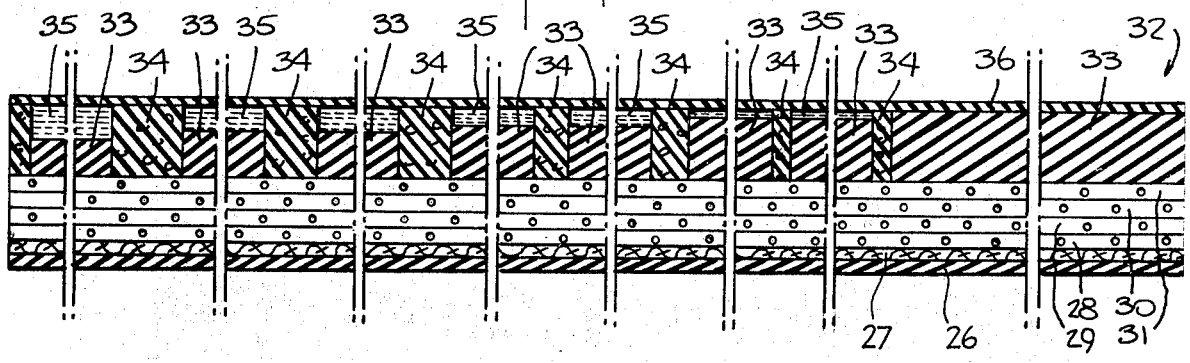
FIG. 3 is an axial cross-section through the wall of part of a third embodiment of the hose according to the invention.

Turning now to FIG. 3, there is illustrated a specific example of a hose employing both these expedients for obtaining varying stiffness. The hose comprises an inner lining 26 of nitrile rubber, a layer 27 of breaker fabric and then four layers, 28–31, of metal wire reinforcement, wires in alternate layers being applied in opposite directions at an angle of from 30° to 70° and preferably about 52° to the hose axis, these layers forming a radially inner hose structure such as was described with reference to FIG. 1. This structure is then semi-cured.

Over the first 10 feet from end 32 of the hose there is then wound (at a helix angle of about 80°) a strip of hard rubber 33 having a Shore A hardness of about 80°, the strip being 5" wide in an axial sense and 1" thick in a radial sense and adjacent turns of the strip being butt joined with no intervening space. Over the next 5 feet of the hose there is wound a 5" wide ⅞" thick strip of the hard rubber 33, with ¼" space between adjacent turns into which is wound a ¼" wide, 1" thick strip of more flexible soft rubber 34 having a Shore A hardness of about 45°. Over the next 5 feet the strip of hard rubber 33 is 5" wide and ¾" thick and the alternating strip of soft rubber 34 is ½" wide and ⅞" thick; over the next 5 feet the strip of hard rubber 33 is 5" wide and ⅝" thick and the alternating strip of soft rubber 34 is 182" wide and ¾" thick; and over the final 5 feet the strip of hard rubber 33 is 5" wide and ½" thick and the alternating strip of soft rubber 34 is 1" wide and ⅝" thick. Thus, the radial thickness of the hard rubber layer 33 in the five zones progressively decreases in the steps 1", ⅞", ¾", ⅝", ½", and the ratio of the widths of hard rubber 33 to soft rubber 34 in the five zones also progressively decreases in the steps 5:0, 5:¼, 5:½, 5:¾, 5:1. The flexibility of the hose thus increases from one end thereof to the other.

Over the regions of hard rubber in this layer are then wound four plies of polyester cord fabric 35, the cords being wound at substantially the same helix angle as the hard rubber strip. The cords are not present over the soft rubber sections of the layer, and as these sections were radially thicker than the hard rubber sections, the cords on the hard rubber sections will render the hose surface substantially uniform in a diametrical sense. Over the polyester cords and soft rubber there is then applied a cover layer 36 of styrene-butadiene rubber, after which the hose can be wrapped and cure completed in the conventional manner.

It will be understood that the foregoing description of the preferred embodiments of the present invention is for purposes of illustration only, and that the various structural and operational features as herein disclosed are susceptible to a number of modifications and changes none of which entail any departure from the spirit and scope of the present invention as defined in the hereto appended claims.

What is claimed is:

1. A flexible suction and discharge hose comprising:
   a tubular substrate including a plurality of plies of reinforcing cords, the cords in each ply extending parallel to one another at a pre-selected bias angle relative to the axis of the tubular substrate and being crossed with respect to the cords of each next adjacent ply;
   a plurality of axially alternating sections of a first material and of a second material circumferentially surrounding said substrate, the second material being more flexible then the first material,
   a fibre reinforcement layer overlying the sections of the first material only, said fibres having a tensile modulus greater than 50 grams per denier; and
   an outer cover circumferentially surrounding said fibre reinforcement layer and said sections of said second material.

2. A hose according to claim 1 wherein said fibres have a tensile modulus greater than 90 grams per denier.

3. A hose according to claim 1 where the fibre is selected from the group consisting of polyamides, polyaramides, polyolefins and polybenzimidazole.

4. A hose according to claim 1 wherein the fibre is selected from the group consisting of modacrylics, graphite, carbon and metal.

5. A hose according to claim 1 where the fibre is monofilament polyester.

6. A hose according to claim 1 wherein said fibre reinforcement layer includes a plurality of plies of said fibre.

7. A hose according to claim 1 wherein each of said axially alternating sections are hoops.

8. A hose according to claim 7 in which the fibres of the reinforcement layer are wound around the hoops of said first material substantially at right angles to the hose axis.

9. A hose according to claim 1 wherein said axially alternating sections are helically wound contiguous strips of said first and second materials.

10. A hose according to claim 9 wherein the winding angle of said strips exceeds 70° relative to the hose axis.

11. A hose according to claim 9 wherein the fibres of said reinforcement layer are wound around the strip of said first material at the same winding angle as said strip of first material.

12. A hose according to claim 1 wherein the axial width of the sections of first material is greater than that of the sections of said second material.

13. A hose according to claim 12 wherein the axial width of the sections of first material is between 3 and 6 times greater than that of the axial width of the sections of second material.

14. A hose according to claim 1 wherein said first and second materials are polymeric.

15. A hose according to claim 1 wherein the Shore A hardness of the first material is between about 70° and about 90°, and the Shore A hardness of the second material is between about 30° and about 50°.

16. A hose according to claim 1 in which the first material is polymeric, and the second material is a foamed polymeric material, the hose structure having a mean density of less than 1.0.

17. A hose according to claim 16 wherein said first material is foamed.

18. A hose according to claim 17 wherein each of said polymers is rubber.

19. A hose according to claim 1 wherein the radial thickness of the sections of said first material progressively decreases from one end of said hose to the other end thereof and the radial thickness of the sections of said second material remains constant, thereby providing a hose which is progressively more flexible from said one end to said other end.

20. A hose according to claim 1 wherein the ratio of the axial widths of said first material to said second material progressively decreases from one end of said hose to the other end thereof, thereby providing a hose which is progressively more flexible from said one end to said other end.

21. A flexible suction and discharge hose comprising:
   a tubular substrate;
   a plurality of axially alternating sections of a first material and of a second material circumferentially surrounding said substrate, the second material being more flexible than the first material, and a fibre reinforcment layer overlying the sections of the first material only, said fibres having a tensile modulus greater than fifty grams per denier.

22. A hose according to claim 21 wherein said fibres have a tensile modulus greater than 90 grams per denier.

23. A hose according to claim 21 where the fibre is selected from the group consisting of polyamides, polyaramides, polyolefins and polybenzimidazole.

24. A hose according to claim 21 wherein the fibre is selected from the group consisting of modacrylics, graphite, carbon and metal.

25. A hose according to claim 21 where the fibre is monofilament polyester.

26. A hose according to claim 21 wherein said fibre reinforcement layer includes a plurality of plies of said fibre.

27. A hose according to claim 21 wherein each of said axially alternating sections are hoops.

28. A hose according to claim 27 in which the fibres of the reinforcement layer are wound around the hoops of said first material substantially at right angles to the hose axis.

29. A hose according to claim 21 wherein said axially alternating sections are helically wound contiguous strips of said first and second materials.

30. A hose according to claim 29 wherein the winding angle of said strips exceeds 70° relative to the hose axis.

31. A hose according to claim 29 wherein the fibres of said reinforcement layer are wound around the strip of said first material at the same winding angle as said strip of first material.

32. A hose according to claim 21 wherein the axial width of the sections of first material is greater than that of the sections of said second material.

33. A hose according to claim 32 wherein the axial width of the sections of first material is between 3 and 6 times greater than that of the axial width of the sections of second material.

34. A hose according to claim 21 wherein said first and second materials are polymeric.

35. A hose according to claim 21 wherein the Shore A hardness of the first material is between about 70° and about 90°, and the Shore A hardness of the second material is between about 30° and about 50°.

36. A hose according to claim 21 in which the first material is polymeric, and the second material is a foamed polymeric material, the hose structure having a mean density of less than 1.0.

37. A hose according to claim 36 wherein said first material is foamed.

38. A hose according to claim 37 wherein each of said polymers is rubber.

39. A hose according to claim 21 wherein the radial thickness of the sections of said first material progressively decreases from one end of said hose to the other end thereof and the radial thickness of the sections of said second material remains constant, thereby providing a hose which is progressively more flexible from said one end to said other end.

40. A hose according to claim 21 wherein the ratio of the axial widths of said first material to said second material progressively decreases from one end of said hose to the other end thereof, thereby providing a hose which is progressively more flexible from said one end to said other end.

* * * * *

UNITED STATES PATENT AND TRADEMARK OFFICE
CERTIFICATE OF CORRECTION

PATENT NO. : 3,871,408
DATED : March 18, 1975
INVENTOR(S) : James Woods et al.

It is certified that error appears in the above-identified patent and that said Letters Patent are hereby corrected as shown below:

Item [76] change "Wood" to --Woods-- and "Sunnett" to --Dunnet--.

Column 1, line 55, "mudulus" should read --modulus--.

Column 2, line 15, insert --to-- between "3" and "6";

line 30, "ventiently" should read --veniently--.

Signed and Sealed this first Day of June 1976

[SEAL]

Attest:

RUTH C. MASON
Attesting Officer

C. MARSHALL DANN
Commissioner of Patents and Trademarks